US009113426B2

(12) United States Patent
Hultell et al.

(10) Patent No.: US 9,113,426 B2
(45) Date of Patent: Aug. 18, 2015

(54) UPLINK POWER CONTROL FOR DUAL AND MULTI CARRIER RADIO SYSTEM

(75) Inventors: Johan Hultell, Solna (SE); Johan Bergman, Stokholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 206 days.

(21) Appl. No.: 13/378,825

(22) PCT Filed: Mar. 26, 2010

(86) PCT No.: PCT/SE2010/050338
§ 371 (c)(1),
(2), (4) Date: Dec. 16, 2011

(87) PCT Pub. No.: WO2011/002388
PCT Pub. Date: Jan. 6, 2011

(65) Prior Publication Data
US 2012/0106422 A1 May 3, 2012

Related U.S. Application Data

(60) Provisional application No. 61/221,672, filed on Jun. 30, 2009.

(51) Int. Cl.
*H04W 52/32* (2009.01)
*H04W 52/34* (2009.01)
*H04W 52/42* (2009.01)

(52) U.S. Cl.
CPC .......... *H04W 52/325* (2013.01); *H04W 52/343* (2013.01); *H04W 52/42* (2013.01)

(58) Field of Classification Search
CPC .. H04W 52/325; H04W 52/343; H04W 52/42
USPC ............... 370/311, 329, 252, 321, 352
See application file for complete search history.

(56) References Cited

U.S. PATENT DOCUMENTS

| | | | | |
|---|---|---|---|---|
| 6,232,921 | B1* | 5/2001 | Aiken et al. | 342/383 |
| 7,369,501 | B2* | 5/2008 | Kim et al. | 370/235 |
| 8,359,055 | B2* | 1/2013 | Usuda et al. | 455/522 |
| 2001/0016499 | A1* | 8/2001 | Hamabe | 455/454 |
| 2002/0173330 | A1* | 11/2002 | Kojima et al. | 455/522 |
| 2003/0123425 | A1* | 7/2003 | Walton et al. | 370/341 |
| 2004/0009786 | A1* | 1/2004 | Terry | 455/522 |
| 2005/0099957 | A1* | 5/2005 | Soldani et al. | 370/252 |
| 2006/0165032 | A1* | 7/2006 | Hamalainen et al. | 370/328 |

(Continued)

FOREIGN PATENT DOCUMENTS

EP 1892854 A1 2/2008
WO 2010051513 A2 5/2010

OTHER PUBLICATIONS

3rd Generation Partnership Project. "Inner Loop Power Control Accuracy Requirements for DC-HSUPA." 3GPP TSG-RAN WG4 Meeting #51bis, R4-092393, Los Angeles, USA, Jun. 29-Jul. 2, 2009.

*Primary Examiner* — Khaled Kassim
(74) *Attorney, Agent, or Firm* — Patent Portfolio Builders, PLLC

(57) ABSTRACT

In a method and a device a time-varying back-off value is used whereby differences in cell load can be taken into account for a restricted time-period during which the information is believed to be valid. Also, other time-varying variables of interest for the initial DPCCH power setting of the secondary earner can be taken into account when setting the back-off value.

10 Claims, 4 Drawing Sheets

(56) References Cited

U.S. PATENT DOCUMENTS

| | | | |
|---|---|---|---|
| 2006/0256805 A1* | 11/2006 | Cho et al. | 370/431 |
| 2007/0082620 A1* | 4/2007 | Zhang et al. | 455/69 |
| 2007/0097962 A1* | 5/2007 | Yoon et al. | 370/352 |
| 2007/0189198 A1* | 8/2007 | Soldani et al. | 370/321 |
| 2008/0013480 A1* | 1/2008 | Kapoor et al. | 370/328 |
| 2008/0081655 A1* | 4/2008 | Shin et al. | 455/522 |
| 2009/0196273 A1* | 8/2009 | Kwon et al. | 370/343 |
| 2009/0213814 A1* | 8/2009 | Heo et al. | 370/335 |
| 2009/0239590 A1* | 9/2009 | Parkvall | 455/572 |
| 2009/0268695 A1* | 10/2009 | Zhao et al. | 370/336 |
| 2010/0027450 A1* | 2/2010 | Montojo et al. | 370/311 |
| 2011/0058507 A1* | 3/2011 | Niki | 370/280 |
| 2011/0182201 A1* | 7/2011 | Pajukoski et al. | 370/252 |
| 2012/0201217 A1* | 8/2012 | Malladi | 370/329 |

* cited by examiner

UPLINK POWER CONTROL FOR DUAL AND MULTI CARRIER RADIO SYSTEM

TECHNICAL FIELD

The present invention relates to methods and devices for use in a cellular radio system using more than one uplink channel.

BACKGROUND

The Enhanced Uplink Channel (E-DCH) is a dedicated channel used by User Equipments (UEs) to transmit data in the uplink. Up to Release 8, a UE could only transmit data on one E-DCH. Third Generation Project Partnership (3GPP) is currently standardizing Dual-Cell HSUPA (High Speed Uplink Packet Access) also known as Dual Carrier HSUPA for HSPA in Release 9. In this release, a UE can transmit one E-DCH on each one of up to two uplink carriers. There have also been proposals in 3GPP to introduce multi-carrier High Speed Packet Access (HSPA) with 3-4 carriers.

When a UE configured for Dual Carrier High Speed Uplink Packet Access (DC-HSUPA) enters the CELL_DCH state only the primary uplink (hereinafter this refers to the serving E-DCH cell that corresponds to the serving HS-DSCH cell) will be activated. The other uplink carriers (hereon after referred to as secondary uplink carriers) will thus initially be deactivated. In order to allow the UE to transmit on these secondary uplink carriers the radio base station, also referred to as Node B needs to send a High Speed Shared Control Channel (HS-SCCH) activation order. Upon receiving such an order, the UE starts sending on the Dedicated Physical Control Channel (DPCCH) so that uplink synchronization can be established. Once this has been achieved the UE may start transmitting on the secondary carrier(s). Since UEs generally can achieve higher data rates by transmitting on multiple carriers simultaneously (as opposed to only transmit data on a the primary uplink carrier) the situation in which the Node B sends an activation order for the secondary uplink(s) just after entering CELL_DCH is believed to be frequently occurring.

Currently in 3GPP it has been agreed, see 3GPP Tdoc R1-092243, "Notes from RAN1 adhoc session on DC-HSUPA, DC-HSDPA MIMO, 2 ms TTI Extension and TxAA extension for non-MIMO UEs" [2] 3GPP Tdoc R1-092254, "Draft 25.214 CR for Introduction of DC-HSUPA" that when a UE receives an HS-SCCH order for activating the secondary uplink carrier the initial DPCCH transmit power should be computed as:

$$\text{Uplink DPCCH transmit power} = P_{DCCH,1} - \text{UE\_Sec\_Tx\_Power\_Backoff}. \quad \text{(equation 1)}$$

Here $P_{DCCH,1}$ is the DPCCH transmit power on the primary uplink carrier and UE_Sec_Tx_Power_Backoff is a parameter that is configured by the Radio Network Controller (RNC) when the UE enters CELL_DCH. In principle, this could take on either positive or negative values. The latter implies that the initial DPCCH power on the secondary carrier exceeds the DPCCH power used on the primary carrier. Note also that the back-off could reflect both static parameters (such as potential differences in carrier frequency) and dynamic parameters (e.g., cell load) which change over time.

For example, if the load on the secondary uplink carrier at the time-instance the UE enters CELL_DCH is higher than the loading on the primary carrier and the Node B would activate the secondary carrier within a time-period so short so that the loading conditions on the carriers would not have changed it could be advantageous to use a negative back-off value (i.e. an initial DPCCH power on the secondary that exceeds the DPCCH power level on the primary carrier) since this would reduce the time-duration until synchronization for the secondary uplink carrier is achieved.

There is a constant desire to improve performance in existing cellular radio systems. Hence, there exist a need for a method and a system that enables an improved setting of the back off for secondary carriers in a Multi carrier cellular radio system.

SUMMARY

It is an object of the present invention to provide an improved setting of back-off parameters for the secondary carrier(s) in cellular radio systems.

This object and others are obtained by the method and the device as set out in the appended claims.

As noted above the back-off (UE_Sec_Tx_Power_Backoff) is configured by the RNC when the UE enters CELL_DCH. However, as has been recognized by the inventor, the secondary uplink carrier can be activated, deactivated, and reactivated at numerous and different times. Thus, the load conditions for the two (or more) carriers may have changed as compared to when the UE initially entered CELL_DCH state. As the back-off UE_Sec_Tx_Power_Backoff is configured by the RNC the same value would have to be used every time the Node B activated (and/or reactivated) the secondary uplink carrier. Because it is undesirable that the UE use a too high initial DPCCH power on its secondary uplink carrier, the RNC would have to take potential load variations into account when determining the value of the back-off. In fact, this will require that the back-off UE_Sec_Tx_Power_Backoff is set conservatively, which in turn will result in unnecessary high delays for achieving synchronization on the secondary uplink carrier in the situation where it is activated just after the UE enters CELL_DCH state.

In accordance with one embodiment a method of selecting transmit power used for physical uplink Control Channel and Data Channel, such as a Dedicated Physical Control Channel, on a secondary carrier used by a user equipment when transmitting data on the secondary carrier in a cellular radio system is provided. The method can comprise the steps of determining a time-varying back-off value for the uplink Control Channel and Data Channel power level, and selecting the received time-varying back-off value to update the uplink Control Channel and Data Channel transmit power. Hereby, an improved performance in the cellular radio system can be achieved.

In accordance with one embodiment the time varying back-off value is received in a message signaled from the cellular radio system network over the air interface. The time varying back-off value can also be determined by some relation in the applicable standard in which case there is no need for signaling the back-off value over the air interface.

In accordance with the present invention a time-varying back-off value is used whereby differences in cell load can be taken into account for a restricted time-period during which the information is believed to be valid. Also, other time-varying variables of interest for the initial DPCCH power setting of the secondary carrier can be taken into account when setting the back-off value. Examples of such other variables can be the carrier frequency used or the user/service type.

In accordance with one embodiment the time varying back off value can be set:

When the UE enters the CELL_DCH state and the radio base station Node B subsequently sends an HS-SCCH order for activation of the secondary uplink carrier, When the UE is deactivated and subsequently reactivated and the elapsed time-duration between de and reactivation is smaller than a certain value. In this case the UE can base the initial DPCCH power of the secondary uplink carrier on the last used power level.

In accordance with one embodiment a method in a network node for generating transmit power value for use in a user equipment used for physical uplink Control Channel and Data Channel on a secondary carrier used by the user equipment when transmitting data on the secondary carrier in a cellular radio system is provided. The method can comprise the steps of generating a time-varying back-off value for the uplink Control Channel and Data Channel power level, and transmitting the time-varying back-off value to the user equipment.

It will be appreciated various processes and methods described may be substantially represented in a computer-readable medium and can be executed by a computer or processor.

The methods and functions in accordance with the above can be provided through the use of a device comprising dedicated hardware as well as hardware capable of executing software. When provided by a processor, the functions may be provided by a single dedicated processor, by a single shared processor, or by a plurality of individual processors, some of which may be shared or distributed. Moreover, a "processor" or "controller" may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawings, in which.

DETAILED DESCRIPTION

The present invention will now be described in more detail by way of non-limiting examples. Although focus in the below description is on the case where the UE enters the CELL_DCH state (since Dual-Carrier HSUPA is limited to this state in Release 9), the invention is applicable to other states (e.g., CELL_FACH) as well if the UE is allowed to transmit on multiple carriers and some of the carriers can be deactivated. The description below is given in the context of a Wideband Code Division Multiple Access (WCDMA) system However, the invention can also be used for other technologies in which multiple carriers can dynamically aggregated (activated/deactivated) by the network on a demand basis. One such example is "carrier aggregation" for Long Term Evolution (LTE)-Advanced.

Figure 1:
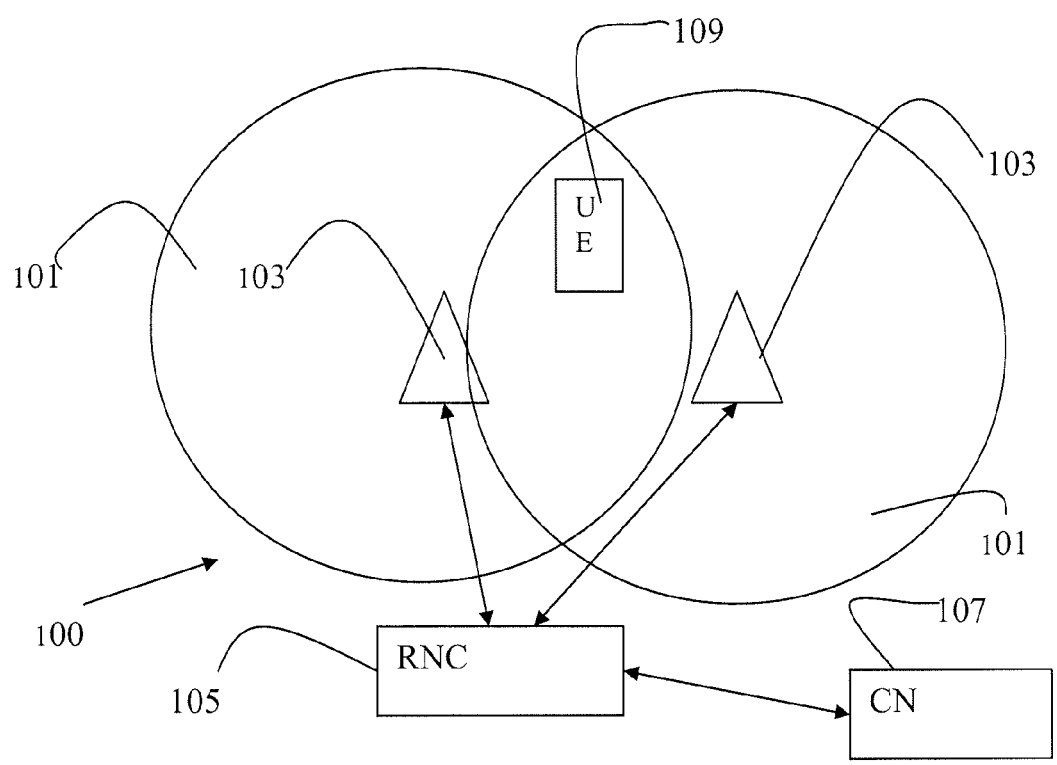
FIG. 1 is a general view of a cellular radio system

In FIG. 1, a general view of a cellular radio system 100 is shown. The system 100 comprises a number of cells 101 together covering a geographical area in which the system 100 provides radio access. Each cell 101 is associated with a radio base station 103, which communicates with a Radio Network Controller (RNC) 105. The RNC is in turn connected to a Core Network (CN) 107. In the geographical area covered by the cellular radio system a mobile station here termed user equipment (UE) 109 may connect to the cellular radio system via a radio base station 203 over an air-interface. The UE 109 can be connected to the system with two or more uplink carriers. The UE 109 can be connected to more than one radio base station 103 simultaneously.

In Dual-Carrier HSUPA a UE can be allowed to transmit data on two uplink carriers using two Enhanced Dedicated Channel (E-DCH) channels. In future releases the UE may be allowed to transmit data on even more carriers.

When a UE enters CELL_DCH and is configured on multiple cells on the uplink only the primary uplink carrier is activated. The initial state of secondary carriers is thus deactivated. In order for the UE to be allowed and transmit data on them the Node B needs to send an HS-SCCH activation order. Upon receiving this activation order the UE starts its synchronization procedure by sending DPCCH on the secondary uplink with an initial power level.

In 3GPP it has been agreed that if the UE receives HS-SCCH activation order the initial DPCCH power level on the secondary uplink carrier should be:

$$\text{Uplink DPCCH transmit power}=P_{DCCH,1}-\text{UE\_Sec\_Tx\_Power\_Backoff} \quad \text{(equation 2),}$$

i.e. the DPCCH power level used on the primary carrier minus some back-off configured by the Radio network Controller (RNC) when the UE enters the CELL_DCH state. Note that this back-off can both be positive and negative. A negative back-off would reflect the situation where the initial DPCCH power on the secondary carrier is greater than the DPCCH power on the primary carrier. Because the initial state of the secondary carrier always is deactivated and UE in most circumstance can achieve higher data rate if it is allowed to transmit on both carriers the situation where the secondary uplink carrier is activated just after the UE enters CELL_DCH will be common. To achieve higher data rates in such situations it has been found advantageous to have a dynamic back-off that, for example, depends on some parameter(s) such as the relative cell loading.

In addition, the secondary carrier can be activated, de activated, and reactivated at numerous and different time-instances. As has been realized, the loading conditions at these may be very different from those that the UE experienced when it initially entered CELL_DCH. Hence, if the same back-offs are used every time the secondary carrier is activated it is not possible to account for time-varying aspects, such as cell load.

In order to exploit the fact that the situation in the system is time varying a time-dynamic power back-off is used. In accordance with one embodiment, this is achieved by configuring two back-off values when the UE enters CELL_DCH. These can be referred to as UE_Backoff_1 and UE_Backoff_2. UE_Backoff_1 denotes the back-off that considers the cell load (and possibly other time-varying effects) while UE_Backoff_2 corresponds to a long-term default back-off that can be used when no (or only outdated) information about the cell load is available to the UE.

In accordance with one embodiment the two back off parameters for setting the Uplink DPCCH transmit power configured as UE_Backoff_1 and UE_Backoff_2 can be transmitted to the UE as UE_Backoff_1 and Δ=UE_Backoff_2−UE_Backoff_1 since this can reduce necessary signaling overhead. Also this will allow the UE to retrieve UE_Backoff_2=Δ+UE_Backoff_1. Moreover, if the UE is in Soft Handover (SHO) the values of UE_Backoff_1 and UE_Backoff_2 can be set to depend on the relative loading in all of the carriers belonging to the activate set for the particular UE.

In accordance with one embodiment the UE that has entered CELL_DCH and obtained UE_Backoff_1 and UE_Backoff_2 can update the value of UE_Backoff_1 according to some method, for example expressed as:

$$(UE\_Backoff\_1)_t = f(UE\_Backoff\_1, t) \quad \text{(equation 3)}$$

so that it after a certain time-duration—beyond which the cell load when the UE entered the CELL_DCH state—is considered to be outdated. After this time-instance the UE utilizes UE_Backoff_2. In the equation 3, UE_Backoff_1 is the initial value of the back-off that was configured when the UE entered CELL_DCH, t the time-duration that has elapsed since the UE entered CELL_DCH, and $(UE\_Backoff\_1)_t$ the value of the back-off that the UE should utilize after a time-duration t has elapsed, and f denotes a function.

Figure 2:
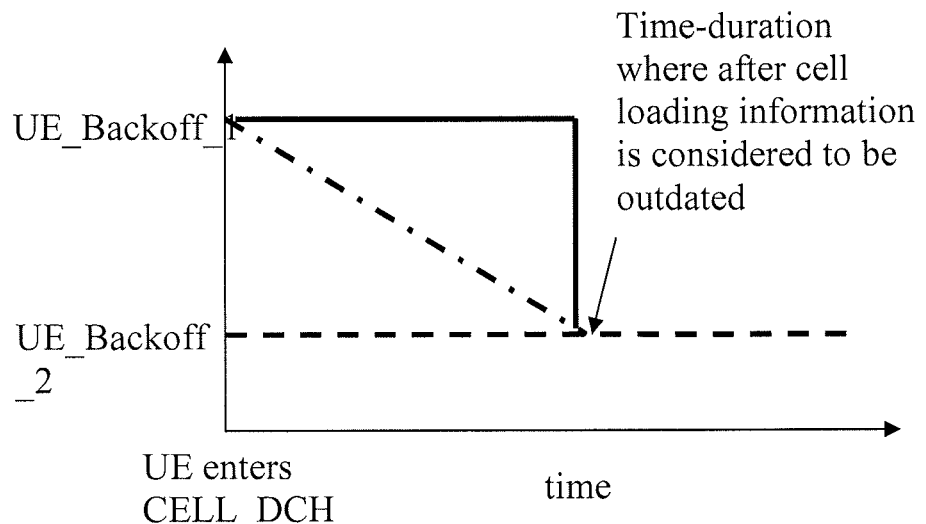
FIGS. 2 and 3 are views illustrating power control schemes.
Figure 3:
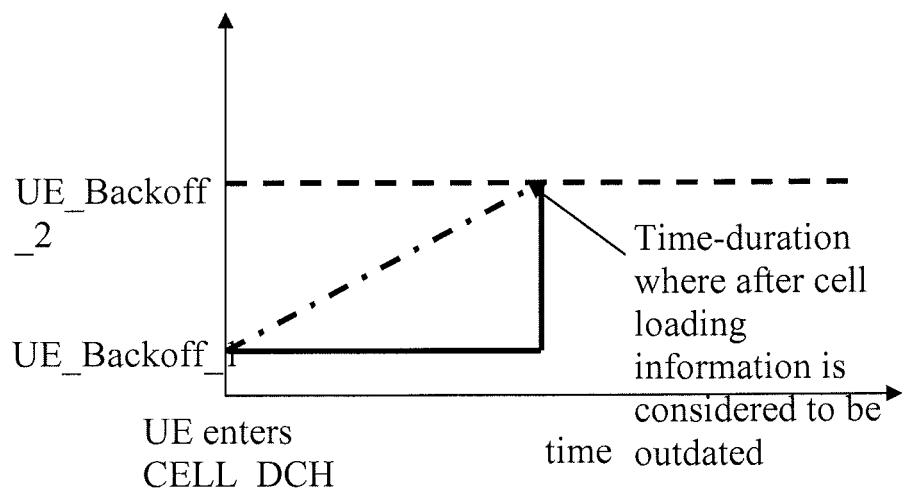

Below some exemplary settings for a time dynamic setting of back off parameters in accordance with the above are given. Again the examples are given in the context of two parameters. A few examples on how the UE_Backoff_1 and UE_Backoff_2 could be configured and how UE_Backoff_1 could be updated are illustrated in FIG. 2 and FIG. 3 respectively. Note that other schemes for updating UE_Backoff_1 are possible.

In FIG. 2 an example illustrating how UE_Backoff_1 and UE_Backoff_2 can be configured and updated in a scenario where the cell load on the secondary serving E-DCH cell exceeds the load on the primary cell. In the figure the solid and dash-dotted curves represents two ways of updating the value of UE_Backoff_1.

In FIG. 3 an example on how UE_Backoff_1 and UE_Backoff_2 can be configured in a setting where the cell load in a secondary serving E-DCH cell is smaller than the load in the primary serving E-DCH cell. In the figure the solid and dash-dotted curves represents two ways of updating the value of UE_Backoff_1.

The UE_Backoff_1 can be updated when the UE has its secondary uplink carrier activated. In situations where the secondary carrier is deactivated and thereafter again reactivated the value of UE_Backoff_1 can be used as initial power DPCCH power level for the secondary carrier. This situation can for example occur when downlink synchronization is lost on the secondary and/or primary downlink carrier. Note also that the UE, once it stops transmitting on the secondary uplink carrier, can be configured to update its value of UE_Backoff_1. This can for example be performed using the method described above in conjunction with equation 3 (used for updating UE_Backoff_1 when the UE has entered CELL_DCH) until it the information becomes outdated and the value of UE_Backoff_1 reaches UE_Backoff_2.

Figure 4:
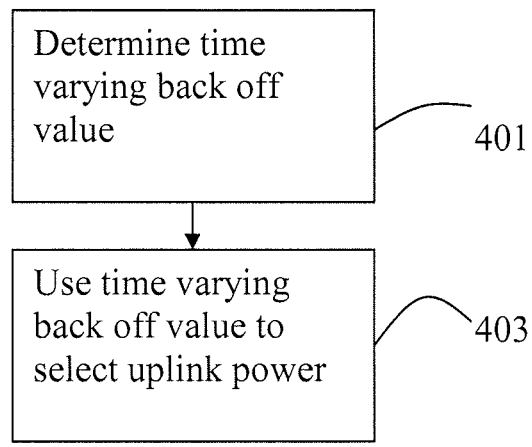
FIG. 4 is a flow chart illustrating some procedural steps when selecting back off value.

In FIG. 4 a flowchart illustrating some procedural steps performed when selecting Uplink DPCCH transmit power on a secondary carrier used by a user equipment when transmitting data on the secondary carrier are depicted. First, in a step 401 a time-varying back-off value for the Dedicated Physical Control Channel power level of the secondary carrier is received. Next, in a step 403, the received time-varying back-off value is selected to update the Dedicated Physical Control Channel transmit power of the secondary carrier.

Figure 5:
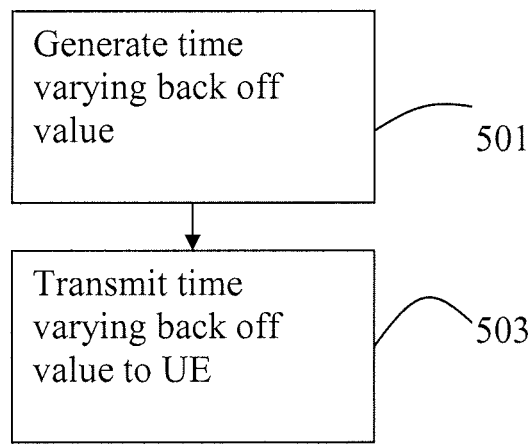
FIG. 5 is a flow chart illustration some procedural steps performed when generating a time varying back off value.

In FIG. 5, a flowchart is show that illustrates some procedural steps performed in control device of a system node of a cellular radio system when generating back-off value for the Dedicated Physical Control Channel transmit power of the secondary carrier used by a user equipment in uplink transmission. First, in a step 501, a time a time-varying back-off value for the Dedicated Physical Control Channel power level of the secondary carrier is generated. Next, in a step 503, the time-varying back-off value is transmitted to the user equipment.

Figure 6:
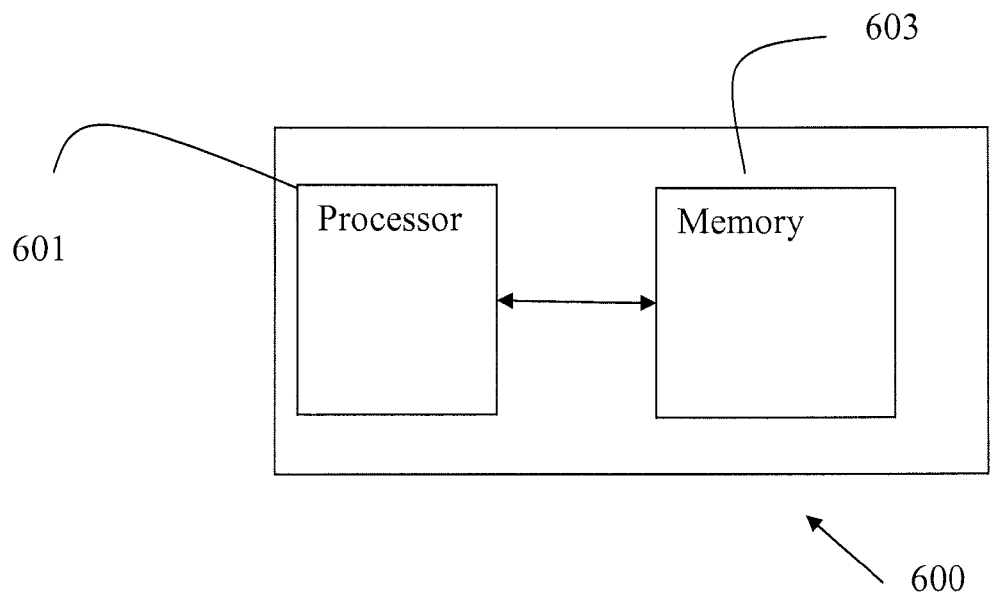
FIG. 6 is a view of a user equipment adapted to use a time-varying back off value.

In FIG. 6 a user equipment 600 adapted to implement the methods as described herein. The user equipment 600 can comprise a micro processor 601 operating on a set of computer program instructions stored in a memory 603. The computer program instructions cause the user equipment to perform the methods as described herein when executed by the micro processor 601.

Figure 7:
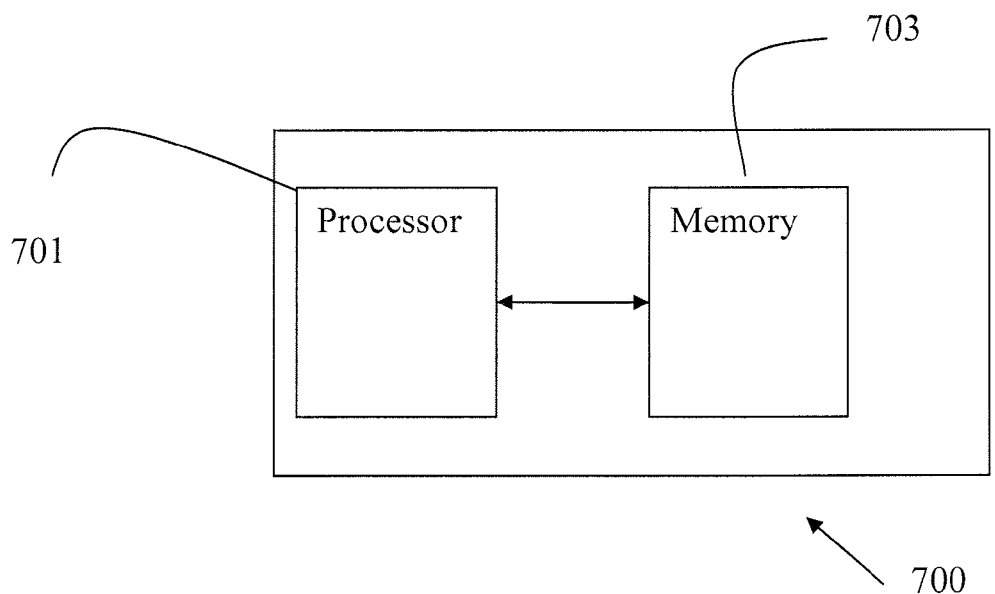
FIG. 7 is a view of a control device for generating a time varying back off value.

In FIG. 7, a control device 700 adapted to be implemented or integrated in a node of a cellular radio system is depicted. The control device can in particular be implemented in a radio network controller or a radio base station of a cellular radio system. The node in which the control device is implemented will typically depend of the technology used in the cellular radio system at hand for a particular implementation. The control device 700 can comprise a micro processor 701 operating on a set of computer program instructions stored in a memory 703. The computer program instructions cause the control device to perform the methods as described herein when executed by the micro processor 701.

While the above examples have been given in the context of UE being in CELL_DCH state the same method can be applied for other states, e.g., CELL_FACH state if the UE is allowed to transmit on multiple carriers and some of the carriers can be deactivated and activated such as a state. In addition, the invention can also be used in other technologies wherein multiple carrier can be dynamically aggregated (activated and deactivated) by the network on a demand basis such as for LTE (Advanced).

Using the method and device as described herein for selecting a dynamic back-off for the initial DPCCH power level of a secondary carrier, in particular a secondary serving E-DCH cell will reduce the synchronization delay when the secondary carrier is activated and knowledge about the current cell loadings exist, and at the same time minimize the risk that the UE uses an initial power level that is too high on its secondary carrier when the relative cell load information is outdated or otherwise inaccurate.

The invention claimed is:

1. A method of selecting transmit power in a user equipment, the method comprising:
determining a time-varying back-off value for a power level of physical uplink Control Channel and Data Channel, wherein the transmit power is used on a secondary carrier used by the user equipment when transmitting data on the secondary carrier in a cellular radio system; and selecting the determined time-varying back-off value to update a transmit power of the physical uplink Control Channel and Data Channel, wherein selecting the determined time-varying back-off value further comprises selecting two time-varying back-off values when the user equipment enters a CELL_DCH state.

2. The method according to claim 1, wherein the uplink Control Channel and Data Channel comprises a Dedicated Physical Control Channel.

3. The method according to claim 1, wherein determining the time-varying back-off value comprises receiving the time-varying back-off value in a message from the cellular radio system.

4. The method according to claim 1, wherein the time-varying back-off value is used:
   when the user equipment enters the Cell$_{13}$ DCH state and the user equipment subsequently receives a High Speed Shared Control Channel order for activation of the secondary uplink carrier from a radio base station; or
   when the secondary uplink carrier of the user equipment is deactivated and subsequently reactivated and the elapsed time-duration between the deactivation and the reactivation is smaller than a threshold.

5. The method according to claim 1, wherein determining the time-varying back-off value comprises determining the time-varying back-off value based on a cell load.

6. A device for selecting transmit power in a user equipment, the device comprising a processor configured to:
   determine a time-varying back-off value for a power level of physical uplink Control Channel and Data Channel, wherein the transmit power is used on a secondary carrier used by the user equipment when transmitting data on the secondary carrier in a cellular radio system; and
   select the determined time-varying back-off value to update a transmit power of the physical uplink Control Channel and Data Channel, wherein the processor is further configured to select two time-varying back-off values when the user equipment enters a CELL_DCH state.

7. The device according to claim 6, wherein the uplink Control Channel and Data Channel comprises a Dedicated Physical Control Channel.

8. The device according to claim 6, wherein the processor is further configured to receive the time-varying back-off value in a message from the cellular radio system.

9. The device according to of claim 6, wherein the processor is further configured to use the time-varying back-off value:
   when the user equipment enters the CELL_DCH state and the user equipment subsequently receives a High Speed Shared Control Channel order for activation of the secondary uplink carrier from a radio base station; or
   when the secondary uplink carrier of the user equipment is deactivated and subsequently reactivated and the elapsed time-duration between the deactivation and the reactivation is smaller than a threshold.

10. The device according to claim 6, wherein the processor is configured to determine the time-varying back-off value based on a cell load.

* * * * *